July 29, 1952 — D. K. STEPHENS — 2,604,647
EXPANDIBLE FLUID ACTUATED PIPE-CLEANING APPARATUS
Filed Sept. 19, 1949 — 2 SHEETS—SHEET 1

Inventor
Dishman K. Stephens
By Fishburn & Mullendore
Attorneys

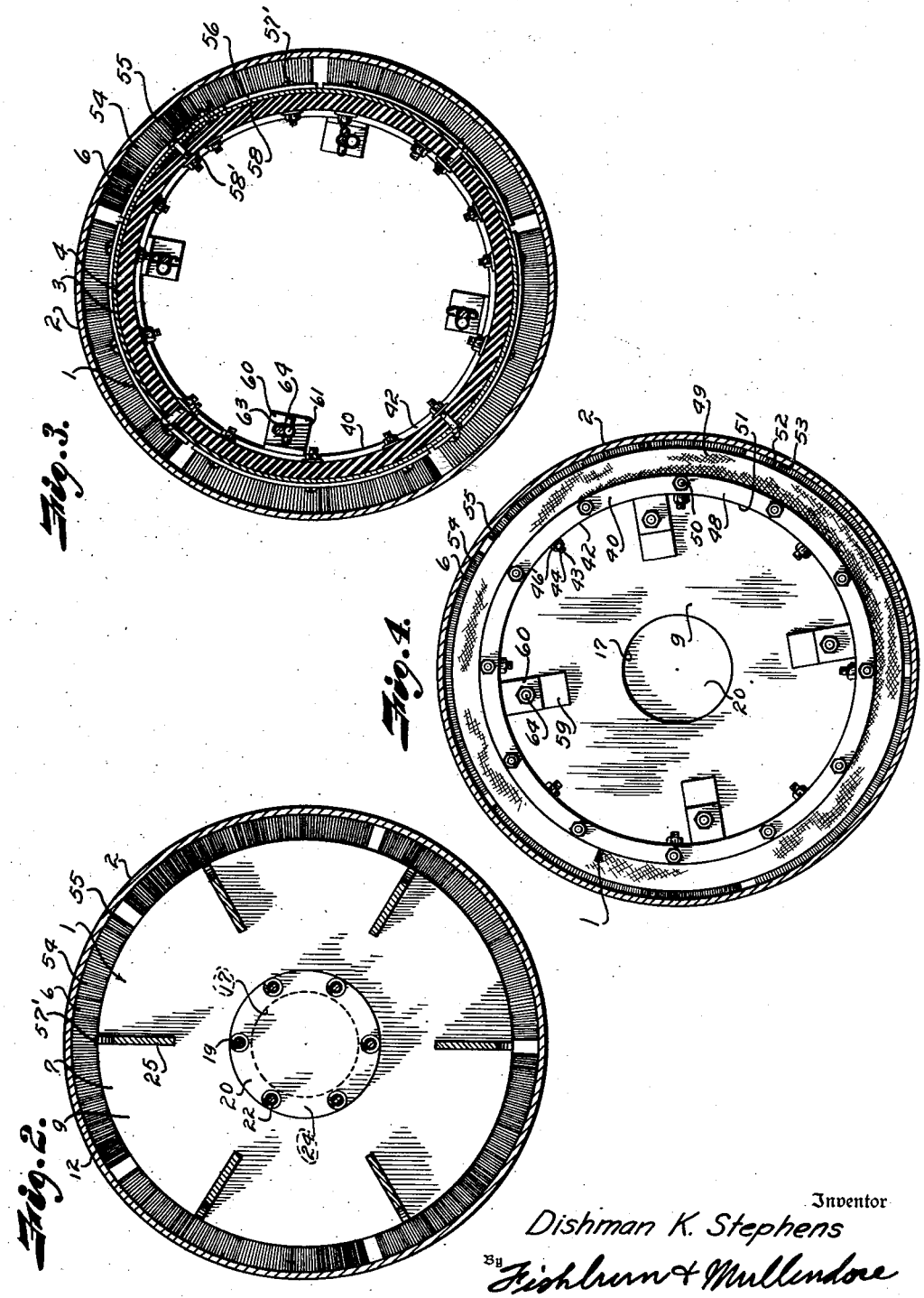

Patented July 29, 1952

2,604,647

UNITED STATES PATENT OFFICE 2,604,647

EXPANDIBLE FLUID ACTUATED PIPE-CLEANING APPARATUS

Dishman K. Stephens, Kansas City, Mo., assignor to Panhandle Eastern Pipe Line Company, Kansas City, Mo., a corporation of Delaware Application September 19, 1949, Serial No. 116,434

9 Claims. (Cl. 15—104.06)

This invention relates to expandable fluid actuated pipe-cleaning apparatus commonly known as a go-devil used in cleaning pipe lines employed for transmitting fluid such as natural gas, and is an improvement over the apparatus shown in my Patent Number 2,447,966, issued on August 24, 1948.

The objects of the present invention are to provide a pipe-cleaning apparatus with a flexible body which is expandable to exert uniform pressure around the interior of a pipe to be cleaned with spaced means for limiting the expansion to the portions of the body therebetween; to provide a cleaning apparatus having an expandable, longitudinal body provided with a plurality of cleaning devices around its exterior surface to contact the walls of a pipe line being cleaned; to provide a device of this character adapted to be propelled by motive fluid such as gas through a pipe line, the motive fluid inflating the body member to expand same; to provide means for controlling the flow of motive fluid through and around the cleaning apparatus to obtain differential fluid pressures between the interior and exterior of the body member and between the portions of the pipe forwardly and rearwardly of the apparatus whereby the differential pressures effect expansion of the body member and propel the apparatus through the pipe line to be cleaned; to provide flexible means longitudinally of the body member for maintaining a predetermined maximum length thereof yet permitting flexibility of the apparatus whereby it may pass around curves and joints in the pipe line; to provide relative areas upon which the differential pressures operate whereby the body member is maintained in tension; and to provide an improved expandable fluid actuated pipe-cleaning apparatus that is economical to manufacture and efficient in operation in cleaning pipe and passing through distorted portions of the pipe such as the curves, joints and the like therein, the pressure of the cleaning devices against the wall of the pipe and the motion of the pipe-cleaning apparatus through the pipe being entirely controlled by a motive fluid flowing through the pipe line.

In accomplishing these and other objects of the invention, I have provided improved details of structure, the preferred form of which is illustrated in the accompanying drawings, wherein:

Fig. 2 is a transverse sectional view through the apparatus on the line 2—2, Fig. 1.

Fig. 3 is a transverse sectional view through the expansion limiting device on the apparatus taken on the line 3—3, Fig. 1.

Fig. 4 is a transverse sectional view taken on the line 4—4, Fig. 1, and showing a rear elevation of the cleaning apparatus.

Figure 1:
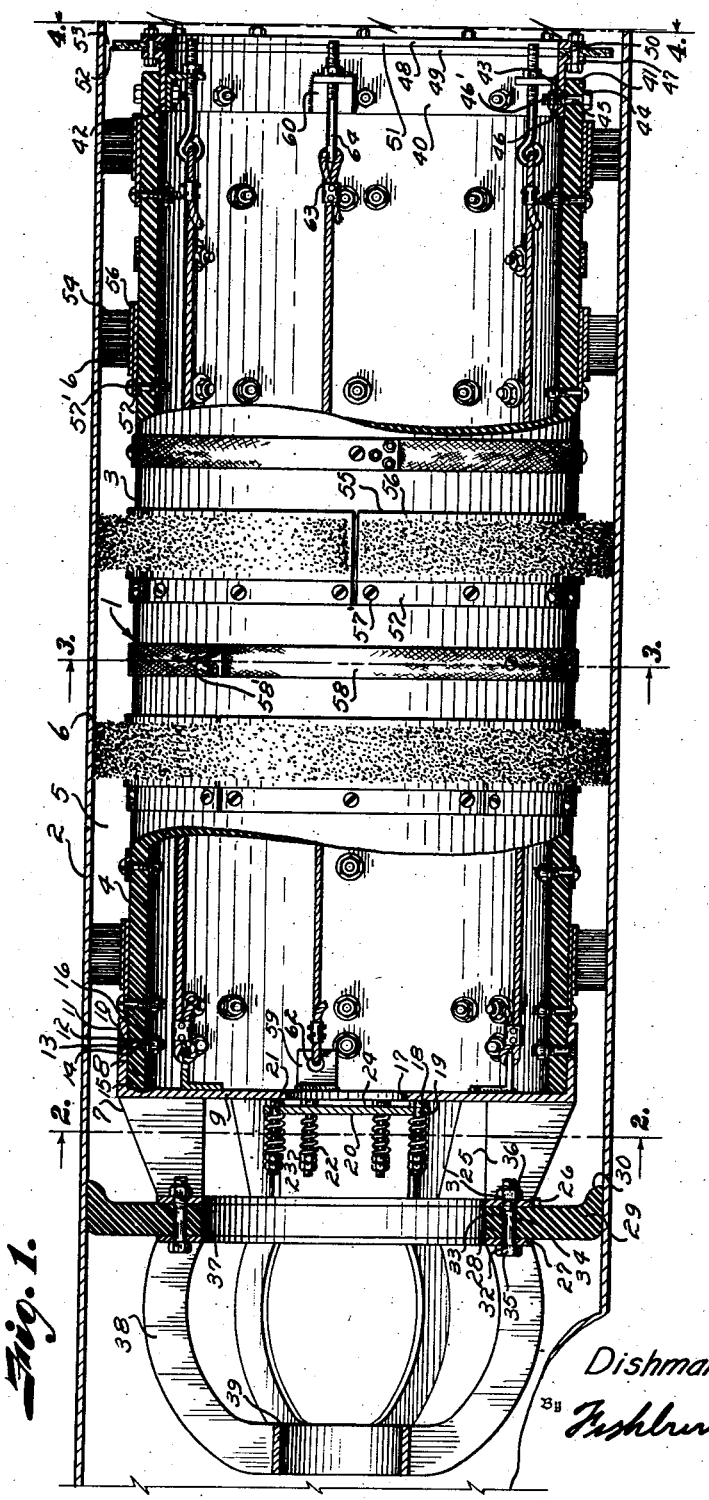
Fig. 1 is a side elevation of my improved expandable fluid actuated pipe-cleaning apparatus, portions being broken away to better illustrate the structure thereof.

Referring more in detail to the drawings:

1 designates an expandable fluid actuated pipe-cleaning apparatus embodying the features of my invention and adapted to be inserted on the inside of a pipe line 2 and be propelled therethrough by gas or other motive fluid applied to the pipe under pressure to the rear of the cleaning apparatus. The pipe-cleaning apparatus consists of a tubular body member 3 preferably of elongated shape and having a wall 4 formed of rubber or the like whereby a greater fluid pressure on the interior than on the exterior of said body member will cause circumferential expansion of the wall. The elongated body member may be formed of a single tubular member or may be a plurality of sections suitably secured together. Also the wall 4 may be reinforced with fabric or the like if desired. The outer diameter of the body member is less than the inside diameter of the pipe to be cleaned to provide an annular space 5 therebetween for a plurality of spaced cleaning devices 6 mounted on the body member as later described whereby said cleaning devices will engage the inside surface of the pipe to clean same.

An end member 7 is mounted on and suitably secured to the forward end 8 of the tubular body member. The end member 7 preferably consists of a plate 9 arranged transversely of the axis of the body member and engaging the end edge thereof, said plate having a rearwardly extending annular flange 10 engaging and suitably secured to the forward end of the body member to confine same. The flange 10 has a plurality of radially arranged countersunk apertures 11 to receive the heads of bolts 12, the shanks 13 of said bolts extending through apertures 14 in the body member and having nuts 15 threaded on said shanks to secure the end member 7 to the body member. Washers 16 are preferably arranged between the nuts 15 and the inner surface of the body member. The plate 9 is preferably provided with a central aperture 17 and suitably secured to the plate, as by welding, around the aperture is a plurality of nuts 18 to which are threaded studs 19. A valve plate 20 having apertures 21 sleeved over the studs 19 is normally held in engagement with the nuts 18 by springs 22 sleeved on the studs and having one end engaging the plate 20 and the other end engaging nuts 23 threaded on the studs. This arrangement provides apertures 24 between the valve plate 20 and the plate 9 to which fluid passing through the interior of the tubular body member and through the aperture 17 escapes to the pipe forwardly of the cleaning apparatus, the springs 22 being such that a predetermined pressure on the interior of the body member will compress said springs and increase the size of the openings 24 to prevent excessive pressures in said body member.

Suitably secured to the plate 9 and extending forwardly therefrom are spaced radially arranged arms 25, the forward ends of which are secured to a metal ring 26. A clamping ring 27 is spaced from the ring 26 and secured therebetween is the inner portion 28 of a squeegee 29 preferably composed of rubber or like material and having a portion extending beyond the rings 26 and 27 with a rearwardly turned peripheral flange 30 thereon forming a surface adapted for engaging the inside of the pipe 2 to be cleaned whereby gas pressure acting on said flange will make a gastight seal between the flange and the interior surface of the pipe. The rings 26 and 27 and the portion 28 of the squeegee 29 are preferably provided with aligned apertures 31, 32 and 33 respectively, for receiving the shanks 34 of bolts 35 whereby nuts 36 threaded on the shanks will draw the ring 27 toward the ring 26 and clamp the portion 28 of the squeegee therebetween.

The squeegee is preferably provided with a bore 37 substantially corresponding with the inner diameters of the rings 26 and 27 whereby said bore serves as an orifice for passage of fluid into the pipe forwardly of the cleaning apparatus but will maintain a differential pressure on the respective sides of the squeegee whereby the pressure of the fluid rearwardly of the squeegee will force the cleaning apparatus through the pipe to be cleaned. Extending forwardly of the clamping ring 27 is a plurality of arcuate guide members 38, the forward ends of said guide members being suitably secured to a ring 39 to which may be attached suitable devices for aiding in maneuvering and handling the cleaning device for moving it to and from a pipe to be cleaned. The guide members are provided with arcuate peripheries as illustrated in Fig. 1 to aid in guiding the apparatus through curved sections of the pipe and over joints and the like therein.

An end member 40 is secured to the rear end 41 of the tubular body member 3, said end member consisting of a cylindrical wall 42 extending into the bore of the tubular member and engaging the inner surface thereof, shanks 43 of bolts 44 extending through aligned apertures 45 and 46 in the body member and cylindrical wall and nuts 46 threaded onto said shanks to rigidly secure the cylindrical wall through the body member. The cylindrical wall extends to the rear of the body member and is provided with an annular flange 47 spaced from the ends of the body member. A metal ring 48 is spaced from the flange 47 with a disk 49 of fabric reinforced rubber or other suitable material arranged therebetween, suitable fastening devices such as bolts and nuts 50 extending through the flange 47, ring 48 and disk 49 for securely clamping the disk between the flange and ring. The disk is preferably provided with a bore 51 for flow of fluid into the interior of the body member and the outer peripheral edge 52 of said disk is preferably spaced as at 53 from the inside surface of the pipe to be cleaned for flow of fluid between the pipe and the exterior of the body member. The spacing 53 may be varied to allow different percentages of the propelling fluid pressure to pass along the outside of the body member whereby the area of the disk and the pressure applied thereto aid in propelling the cleaning apparatus through the pipe and also the spacing 53 and the size of the bore 51 in the disk aid in regulating the internal pressure in the body member or differential pressure between the interior and exterior thereof.

A plurality of brushes 6 is spaced along the longitudinal length of the body member, said brushes preferably extending around the outer circumference of the body member and having bristles 54 of wire, hair or other suitable material, of suitable length to engage the inside surface of the pipe. The bristles of the respective brushes may all be of the same stiffness or they may be of different stiffness or material as desired, whereby they will remove scale and other matter from the inside of the pipe and will also polish and clean same as the cleaning apparatus is propelled therethrough.

For ease of assembly, it is preferred that the brushes of each circumferential row be formed of sections 55 with the ends substantially abutting, the bristles being secured to suitable bases 56 having flanges 57 which are suitably secured as by bolts 57' to the wall of the tubular body member. With this arrangement, fluid pressure on the inside of the body member will expand same to force the bristles of the brushes against the interior surface of the pipe, but in an elongated body member, there would be a tendency for the central portion of the body member to expand more than the portion adjacent the ends. In order to substantially equalize the expansion of the body member in the respective portions mounting the brushes thereon, bands 58 of web belting or other suitable substantially nonexpansible material are arranged around the body member between and spaced from the respective brushes, the bands being secured by bolts or other suitable fastening devices 58 to the body member whereby the expansion thereof will be in the portions between the bands 58, which are the portions on which the brushes are mounted.

While there is some propelling force applied to the rear of the body member and additional propelling force applied to the squeegee which is secured to the forward ends of the body member, in normal operation the body member is in tension due to the resistance of movement resulting from contact of the brush bristles with the pipe. In order to prevent excessive elongation of the body member suitable angle clips 59 and 60 are secured to the plate 9 and cylindrical wall 41 respectively, said clips preferably being adjacent the wall of the body member whereby steel cables or the like may be secured as at 62 to the angle clips 59 and have their other ends secured as at 63 to eyebolts 64 adjustably mounted in the angle clips 60. With this arrangement a plurality of the cables 61, for example four, is arranged around the interior of the body member and extend longitudinally thereof to limit the extension of the body member. In passing around curves in pipes, one or two of the cables will limit the extension of the outer portion and the other cables on the inner portion of the curves will be relatively loose whereby said cables will under any circumstances provide an adjustable limit to the extension of the body member and thereby prevent rupture thereof.

In the operation of a cleaning apparatus constructed and assembled as described, the forward end is inserted in the pipe line 2 and the entire cleaning apparatus pushed or otherwise moved to locate same in the bore of the pipe, the outer edges of the squeegee 29 and the bristles of the brushes 6 engaging the interior surface of said pipes. The portion of the pipe to the rear of the cleaning apparatus is then closed and gas or other motive fluid applied to said pipe to the rear of the cleaning apparatus. The flow of motive fluid in the pipe will apply fluid pressure to the cleaning apparatus to propel same through the pipes. Some of the fluid will pass through the space 53 between the disk 49 and the inside wall of the pipe and move through the brushes to blow the scale and other foreign material removed from the pipe by the bristles to the forward end of the cleaning apparatus where said fluid and the foreign material carried thereby will pass between the squeegee and the plate 9 and through the bore 37 of said squeegee to blow on the head of the cleaning apparatus. Also fluid pressure will enter the interior of the body member 3 with some of said fluid passing through the aperture 17 and openings 24 between the valve plate 20 and the plate 9, said fluid also passing through the bore 37 of the squeegee. The difference in the area of the space 53 and the bore 51 allowing greater flow of fluid pressure into the body member will create a differential in pressure between the interior and exterior thereof and expand the portions of the body member on which the brushes are mounted. This inflation and expansion of the body member will cause the brushes to be moved out into engagement with the inner surface of the pipe line and provide uniform engagement therebetween even though the pipe may be distorted, the bands 58 restricting the expansion of the portions intermediate the brushes whereby the engagement of the bristles of the respective brushes along the length of the body member is substantially uniform. If the pressure on the interior of the body member becomes excessive, the pressure acting on the valve plate 20 will compress the springs 22, increasing the openings 24 to relieve said pressure and prevent damage to the cleaning apparatus, however, all of the fluid passing through or around the body member acts on the squeegee 29 and the area thereof being greater than the area of the disk 49 provides greater force on the forward end of the cleaning apparatus whereby it is pulled through the pipe line, pressure on the disk 49 merely tending to reduce the amount of tension on the walls of the body member. In moving through straight portions of the pipe, all of the cables 61 will be under tension and prevent excessive extension of the body member. In moving around curves, the guide members tend to aid the cleaning apparatus in passing through the pipe, particularly small bends. Also in such curves the body member will be bent to conform thereto, loosening some of the cables 61 but the cables on the outer portion of the curve will limit the extension of the body member whereby there is no danger of rupture of same.

It will be obvious from the foregoing that I have provided an improved expandable fluid actuated pipe-cleaning device capable of passing by chill rings, joints or the like in pipe and operating around curves or in deformed portions of pipe for uniformly cleaning the inside thereof, the regulation of the fluid flow through and around the apparatus and the differential in pressures effecting a controlled operation for efficiently cleaning pipe.

What I claim and desire to secure by Letters Patent is:

1. A pipe-cleaning apparatus adapted to be moved by motive fluid through a pipe to be cleaned comprising an elongated flexible expandable hollow body having an open rear end, means closing the forward end of the body member and having an aperture therein for passage of motive fluid therethrough, means on the rear end of the body member for restricting flow of motive fluid around the exterior of the body member and cooperating with the apertures in the closing means on the forward end of the body to maintain a differential pressure between the interior and exterior of the body for effecting circumferential expansion of said body, annular rows of brushes secured around the outer circumference of said body and spaced longitudinally thereof, means engaging the body member between selected rows of brushes and adapted to limit the expandable areas of said body member to the portions adjacent the brushes, and means carried by the forward end closing means spaced forwardly thereof for restricting flow of motive fluid to the pipe ahead of the apparatus for maintaining a differential pressure between the respective ends thereof whereby the motive fluid will propel the apparatus through the pipe, and means connecting the forward end closing member and means on the rear end of the body for maintaining the relative spacing therebetween.

2. A pipe-cleaning apparatus adapted to be moved by motive fluid through a pipe to be cleaned comprising a flexible expandable hollow tubular body member having an open rear end, means closing the forward end of said body member, said forward end closing means having valve controlled apertures for effecting escape through the pipe ahead of the apparatus of a portion of the motive fluid entering the body member, means supported by the body adjacent the rear end thereof and having a peripheral edge adjacent the pipe, the area of the spacing between said peripheral edge and the pipe being less than the area of the open rear end of the body to maintain a differential pressure between the interior and exterior of the body effecting circumferential expansion of said body, a series of rows of cleaning devices around the outer circumference of said body member, means engaging the body member between selected rows of cleaning devices and adapted to limit the expandable area of said body member to the portion adjacent the cleaning devices, and means carried by the forward end member engaging the pipe for maintaining a differential in pressure between the respective ends thereof whereby the motive fluid will propel the apparatus through the pipe.

3. A pipe-cleaning apparatus adapted to be moved by motive fluid through a pipe to be cleaned comprising a flexible expandable hollow tubular body member having an open rear end, means closing the forward end of said body member, said forward end closing means having valve controlled apertures for effecting escape through the pipe ahead of the apparatus of a portion of the motive fluid entering the body member, a diaphragm secured to the body adjacent the rear end thereof and having a peripheral edge adjacent the pipe, said diaphragm having a central aperture therein whereby the area of the spacing between the diaphragm edge and the pipe is less than the area of the central opening and rear end of the body to maintain a differential pressure between the interior and exterior of the body effecting circumferential expansion of said body, a series of rows of brushes around the outer circumference of said body member, means engaging the body member between selected rows of brushes and adapted to limit the expandable area of said body member to the portion adjacent the brushes, and means carried by the forward end member and engaging the pipe for maintaining a differential in pressure between the respective ends thereof whereby the motive fluid will propel the apparatus through the pipe.

4. A pipe-cleaning apparatus adapted to be moved by motive fluid through a pipe to be cleaned comprising a flexible expandable hollow tubular body member having an open rear end, means closing the forward end of said body member, said forward end closing means having valve controlled apertures for effecting escape through the pipe ahead of the apparatus of a portion of the motive fluid entering the body member, a diaphragm secured to the body adjacent the rear end thereof and having a peripheral edge adjacent the pipe, said diaphragm having a central aperture therein whereby the area of the spacing between the diaphragm edge and the pipe is less than the area of the central opening and rear end of the body to maintain a differential pressure between the interior and exterior of the body effecting circumferential expansion of said body, a series of rows of brushes around the outer circumference of said body member, means engaging the body member between selected rows of brushes and adapted to limit the expandable area of said body member to the portion adjacent the brushes, and a resilient orifice member carried by the forward end member and spaced forwardly thereof, said orifice member substantially engaging the pipe and maintaining a differential in pressure between the respective ends thereof whereby the motive fluid will propel the apparatus through the pipe.

5. A pipe-cleaning apparatus adapted to be moved by motive fluid through a pipe to be cleaned comprising a flexible expandable hollow tubular body member having an open rear end, means closing the forward end of said body member, said forward end closing means having valve controlled apertures for effecting escape through the pipe ahead of the apparatus of a portion of the motive fluid entering the body member, a diaphragm secured to the body adjacent the rear end thereof and having a peripheral edge adjacent the pipe, said diaphragm having a central aperture therein whereby the area of the spacing between the diaphragm edge and the pipe is less than the area of the central opening and rear end of the body to maintain a differential pressure between the interior and exterior of the body effecting circumferential expansion of said body, a series of rows of brushes around the outer circumference of said body member, means engaging the body member between selected rows of brushes and adapted to limit the expandable area of said body member to the portion adjacent the brushes, means carried by the forward end member and spaced forwardly thereof and engaging the pipe for maintaining a differential in pressure between the respective ends thereof whereby the motive fluid will propel the apparatus through the pipe, and means secured to the end members for restricting the longitudinal expansion of the body.

6. A pipe-cleaning apparatus adapted to be moved by motive fluid through a pipe to be cleaned comprising a flexible expandable hollow tubular body member having an open rear end, means closing the forward end of said body member, said forward end closing means having valve controlled apertures for effecting escape through the pipe ahead of the apparatus of a portion of the motive fluid entering the body member, a diaphragm secured to the body adjacent the rear end thereof and having a peripheral edge adjacent the pipe, said diaphragm having a central aperture therein whereby the area of the spacing between the diaphragm edge and the pipe is less than the area of the central opening and rear end of the body to maintain a differential pressure between the interior and exterior of the body effecting circumferential expansion of said body, a series of rows of brushes around the outer circumference of said body member, means engaging the body member between selected rows of brushes and adapted to limit the expandable area of said body member to the portion adjacent the brushes, a resilient orifice member carried by the forward end member and spaced forwardly thereof, said orifice member substantially engaging the pipe and maintaining a differential in pressure between the respective ends thereof whereby the motive fluid will propel the apparatus through the pipe, and means secured to the end members for restricting the longitudinal expansion of the body.

7. A pipe-cleaning apparatus adapted to be moved by motive fluid through a pipe to be cleaned comprising a flexible expandable hollow body having open ends, end members secured to the ends of the body, the rear end member having an opening therein for passage of motive fluid into the interior of the body member, the forward end member having an opening therein, means responsive to fluid pressure in the body for varying the effective area of the opening in the forward member, means secured to the body adjacent the rear end thereof and having a peripheral edge adjacent the pipe whereby the area of the spacing between said peripheral edge and the pipe is less than the area of the open end of the body to maintain a differential pressure between the interior and exterior of the body for effecting circumferential expansion of said body, a resilient member supported by the forward end member and spaced therefrom, said resilient member having a flange adapted to be expanded into engagement with the pipe by the motive for maintaining differential pressure between the respective ends thereof, said resilient member having an aperture therein for flow of motive fluid around the body and through the body to the portion of the pipe forwardly of the resilient member, and circumferential rows of arcuate brushes on the body member and spaced longitudinally thereof and adapted for uniform circumferential engagement of the interior of the pipe for cleaning same.

8. A pipe-cleaning apparatus adapted to be moved by motive fluid through a pipe to be cleaned comprising a flexible expandable hollow body having open ends, end members secured to the ends of the body, the rear end member having an opening therein for passage of motive fluid into the interior of the body member, the forward end member having an opening therein, a plate for restricting the area of the opening in the forward end member, means for mounting said plate for movement to and from the opening, resilient means urging the plate toward the opening whereby predetermined pressure of motive fluid in the interior of the body will move the plate to increase the flow of motive fluid through the opening in the forward end, means secured to the body adjacent the rear end thereof and having a peripheral edge adjacent the pipe whereby the area of the spacing between said peripheral edge and the pipe is less than the area of the open end of the body to maintain a differential pressure between the interior and exterior of the body for effecting circumferential expansion of said body, a resilient member supported by the forward end member and spaced therefrom, said resilient member having a flange adapted to be expanded into engagement with the pipe by the motive for maintaining differential pressure between the respective ends thereof, said resilient member having an aperture therein for flow of motive fluid around the body and through the body to the portion of the pipe forwardly of the resilient member, and rows of cleaning devices on the body member and spaced longitudinally thereof and adapted for uniform engagement of the interior of the pipe for cleaning same.

9. A pipe-cleaning apparatus adapted to be moved by motive fluid through a pipe to be cleaned comprising a flexible expandable hollow body having open ends, nonexpansible end members secured to the ends of the body, the rear end member having an opening therein for passage of motive fluid into the interior of the body member, the forward end member having an opening therein, a plate for restricting the area of the opening in the forward member, means on the forward end member for mounting said plate for movement to and from the opening, resilient means urging the plate toward the opening whereby predetermined pressure of motive fluid in the interior of the body will move the plate to increase the flow of motive fluid through the opening in the forward end, means connecting the end members for maintaining the relative spacing therebetween, a flange means secured to the body adjacent the rear end thereof and having a peripheral edge adjacent the pipe whereby the area of the spacing between the flange edge and the pipe is less than the area of the open end of the body to maintain a differential pressure between the interior and exterior of the body for effecting circumferential expansion of said body, a resilient member supported by the forward end member and spaced therefrom, said resilient member having a flange adapted to be expanded into substantially sealing engagement with the pipe by the motive for maintaining differential pressure between the respective ends thereof, said resilient member having an aperture therein for flow of motive fluid around the body and through the body to the portion of the pipe forwardly of the resilient member, and circumferential rows of arcuate brushes on the body member and spaced longitudinally thereof and adapted for uniform circumferential engagement of the interior of the pipe for cleaning same.

DISHMAN K. STEPHENS.

REFERENCES CITED

The following references are of record in the file of this patent:

UNITED STATES PATENTS

| Number | Name | Date |
|---|---|---|
| 1,806,478 | Long | May 19, 1931 |
| 2,447,966 | Stephens | Aug. 24, 1948 |